(12) United States Patent
Yue et al.

(10) Patent No.: US 11,184,912 B2
(45) Date of Patent: Nov. 23, 2021

(54) SCHEDULING REQUEST PROCESSING METHOD AND USER EQUIPMENT

(71) Applicant: VIVO MOBILE COMMUNICATION CO., LTD., Guangdong (CN)

(72) Inventors: Ran Yue, Guangdong (CN); Xiaodong Yang, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

(21) Appl. No.: 16/652,095

(22) PCT Filed: Aug. 27, 2018

(86) PCT No.: PCT/CN2018/102553
§ 371 (c)(1),
(2) Date: Mar. 30, 2020

(87) PCT Pub. No.: WO2019/062422
PCT Pub. Date: Apr. 4, 2019

(65) Prior Publication Data
US 2020/0305181 A1 Sep. 24, 2020

(30) Foreign Application Priority Data
Sep. 28, 2017 (CN) .......................... 201710900929.3

(51) Int. Cl.
*H04W 72/12* (2009.01)
*H04W 28/02* (2009.01)

(52) U.S. Cl.
CPC ... *H04W 72/1284* (2013.01); *H04W 28/0278* (2013.01)

(58) Field of Classification Search
CPC ............. H04W 28/0278; H04W 72/12; H04W 72/1284; H04W 28/02
See application file for complete search history.

(56) References Cited

U.S. PATENT DOCUMENTS

2010/0284354 A1 11/2010 Ostergaard et al.
2011/0059745 A1* 3/2011 Yi .......................... H04L 5/0053
455/452.2
(Continued)

FOREIGN PATENT DOCUMENTS

| CN | 101771521 A | 7/2010 |
| CN | 104170491 A | 11/2014 |

(Continued)

OTHER PUBLICATIONS

International Search Report and Written Opinion dated Apr. 4, 2019 issued in PCT/CN2018/102553.
(Continued)

*Primary Examiner* — Nathan S Taylor
(74) *Attorney, Agent, or Firm* — Gearhart Law LLC; David Postolski, Esq.

(57) ABSTRACT

The present disclosure provides a scheduling request processing method and a user equipment, which can improve cancellation/cancellation exemption mechanism for a scheduling request (SR) in an NR system. The method includes: determining whether to cancel a triggered scheduling request (SR) and/or stop an SR-prohibit timer according to a current status of a buffer status report (BSR). This technical solution improves cancellation/cancellation exemption mechanism of the SR, and especially when applied to the NR system, can reduce delay of the delay-sensitive service (such as URLLC service), thereby improving system performance.

20 Claims, 3 Drawing Sheets

(56) References Cited

U.S. PATENT DOCUMENTS

| | | | | |
|---|---|---|---|---|
| 2012/0100864 | A1* | 4/2012 | Susitaival | H04W 72/0446 455/450 |
| 2012/0294269 | A1* | 11/2012 | Yamada | H04W 74/02 370/329 |
| 2012/0294270 | A1* | 11/2012 | Yamada | H04W 74/02 370/329 |
| 2012/0307767 | A1* | 12/2012 | Yamada | H04W 74/02 370/329 |
| 2013/0235768 | A1* | 9/2013 | Earnshaw | H04L 5/006 370/280 |
| 2014/0295860 | A1* | 10/2014 | Kuo | H04W 24/04 455/450 |
| 2015/0049697 | A1 | 2/2015 | Worrall et al. | |
| 2015/0173047 | A1* | 6/2015 | Yamada | H04W 28/18 370/329 |
| 2015/0173120 | A1* | 6/2015 | Yamada | H04W 76/11 370/331 |
| 2016/0128094 | A1* | 5/2016 | Lee | H04W 72/14 370/329 |
| 2016/0157256 | A1* | 6/2016 | Tseng | H04W 28/0278 370/329 |
| 2017/0188349 | A1* | 6/2017 | Lee | H04W 72/1215 |
| 2017/0238337 | A1* | 8/2017 | Lee | H04W 72/14 370/329 |
| 2017/0325119 | A1* | 11/2017 | Lee | H04W 4/029 |
| 2018/0035453 | A1* | 2/2018 | Yamada | H04W 72/0413 |
| 2018/0049231 | A1* | 2/2018 | Yamada | H04W 72/1284 |
| 2018/0063832 | A1* | 3/2018 | Yamada | H04W 72/0413 |
| 2018/0077749 | A1* | 3/2018 | Yamada | H04L 5/0053 |
| 2018/0199230 | A1* | 7/2018 | Lee | H04W 28/0278 |
| 2018/0242357 | A1* | 8/2018 | Khirallah | H04W 72/14 |
| 2018/0324872 | A1* | 11/2018 | Babaei | H04W 72/042 |
| 2019/0082493 | A1* | 3/2019 | Lee | H04L 1/00 |
| 2019/0089507 | A1* | 3/2019 | Dinan | H04W 74/0833 |
| 2019/0261396 | A1* | 8/2019 | Dinan | H04L 5/00 |

FOREIGN PATENT DOCUMENTS

| | | |
|---|---|---|
| CN | 104320857 A | 1/2015 |
| CN | 107079469 A | 8/2017 |
| CN | 108811146 A | 11/2018 |
| WO | 2016182344 A1 | 11/2016 |

OTHER PUBLICATIONS

Huawei, 3GPP TSG-RAN WG2 Meeting #99, R2-1708556, SR Configuration and Triggering for sTTI, Aug. 25, 2017.

3GPP TSG-RAN WG2 Meeting #99, R2-1709416, SR Cancellation for sTTI, Aug. 25, 2017.

Extended European Search Report dated Oct. 2, 2020 issued in PCT/CN2018/102553.

3GPP TSG RAN WG2 #99, R2-1707736, "Details of SR procedure", Berlin, Germany, 21"t—25rh Aug. 2017, 4 pages.

3GPP TSG RAN WG2 #99, R2-1709176, "Text Proposal for Scheduling Request in NR (Option 2)", Berlin, Germany, Aug. 2I-25, 2017, 2 pages.

3GPP TSG-RAN WG2 Meeting #99bis, R2-1710974, "Discussion on the SR cancellation and failure handling", Prague, Czech Republic, gtn—13tn Oct. 2017, 4 pages.

3GPP TSG-RAN WG2 NR ad-hoc #18-07, R2-1809565, "Alignment of SR and BSR cancellation conditions", Montreal, Canada, Jul. 2-6, 2018, 5 pages.

Oct. 19, 2020 Office Action issued in Chinese Application No. 201710900929.3.

* cited by examiner ns # SCHEDULING REQUEST PROCESSING METHOD AND USER EQUIPMENT This application is the U.S. national phase of the PCT Application PCT/CN2018/102553 filed on Aug. 27, 2018, which claims the benefit and priority of Chinese Application No. 201710900929.3, filed on Sep. 28, 2017, which is incorporated herein by reference in its entirety.

TECHNICAL FIELD

The present application relates to the field of communications, and in particular to a scheduling request processing method and a user equipment.

BACKGROUND

In the Long Term Evolution (LTE) system, once Scheduling Request (SR) is triggered, the SR is considered to be in a pending state before the SR is canceled. The condition for cancelling the SR in the pending state includes: an assembled Media Access Control Layer Protocol Data Unit (MAC PDU) includes a Buffer Status Report (BSR), and the BSR includes the latest buffer status when the BSR is triggered; or, allocated uplink resources are sufficient to transmit all available pending data.

In the New Radio (NR) system, when a single cell is confirmed, each logical channel may be mapped to 0 to 1 SR, but there is no clear conclusion about cancellation of the SR at present. If the SR cancellation policy in the LTE system is used, when two or more logical channels exist, it is assumed that one of the logical channels corresponds to the eMBB service and is called LCH1, and the other logical channel corresponds to ultra-reliable and low latency communications (URLLC) service and is called LCH2. If LCH1 has a lower priority than LCH2, LCH1 first triggers and transmits SR1, and LCH2 subsequently triggers SR2, then SR2 is in the Pending state. At this point, if an uplink grant is received and the grant can include the latest buffer status when the BSR is triggered, then SR2 will be cancelled. When the UL grant for transmitting the BSR is obtained through SR1, after the BSR is transmitted, uplink data is scheduled to be transmitted. This process results in a large data delay on LCH2.

SUMMARY

An object of embodiments of the present disclosure is to provide a scheduling request processing method and a user equipment, which can improve cancellation/cancellation exemption mechanism for a scheduling request (SR) in an NR system.

In order to solve the above technical problem, the embodiments of the present disclosure are realized as follows.

According to a first aspect, one embodiment of the present disclosure provides a scheduling request processing method, including: determining whether to cancel a triggered scheduling request (SR) and/or stop an SR-prohibit timer according to a current status of a buffer status report (BSR).

According to a second aspect, one embodiment of the present disclosure provides a user equipment including: a first determining module used to determine whether to cancel a triggered scheduling request (SR) and/or stop an SR-prohibit timer according to a current status of a buffer status report (BSR).

According to a third aspect, one embodiment of the present disclosure provides a user equipment including: a processor, a memory, and a computer program stored on the memory and operable on the processor; wherein the computer program is executed by the processor to implement steps of the scheduling request processing method.

According to a fourth aspect, one embodiment of the present disclosure provides a computer readable storage medium including a computer program stored thereon; wherein the computer program is executed by a processor to implement steps of the scheduling request processing method.

BRIEF DESCRIPTION OF THE DRAWINGS

In order to illustrate technical solutions according to embodiments of the present disclosure or in the related art more clearly, drawings to be used in the description of the embodiments or in the related art will be described briefly hereinafter. Apparently, the drawings described hereinafter are only some embodiments of the present disclosure, and other drawings may be obtained by those skilled in the art according to those drawings without creative work.

DETAILED DESCRIPTION

The technical solution of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

The technical solution of the present application may be applied to various communication systems, such as Global System of Mobile communication (GSM), Code Division Multiple Access (CDMA) system, Wideband Code Division Multiple Access Wireless (WCDMA), General Packet Radio Service (GPRS) and Long Term Evolution (LTE).

The user equipment may also be referred as a mobile terminal, access terminal, subscriber unit, subscriber station, mobile station, mobile platform, remote station, remote terminal, mobile device, user terminal, terminal, wireless communication device, user agent or user device. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device, other processing device coupled to wireless modems, in-vehicle device, wearable device, user equipment in future 5G network or in future evolved Public Land Mobile Network (PLMN).

The system to which the present application is applicable, may be Frequency Division Duplex (FDD) system, a Time Division Duplex (TDD) system, or a system in which FDD and TDD are used in a duplex mode, which are not limited in this application.

Figure 1:
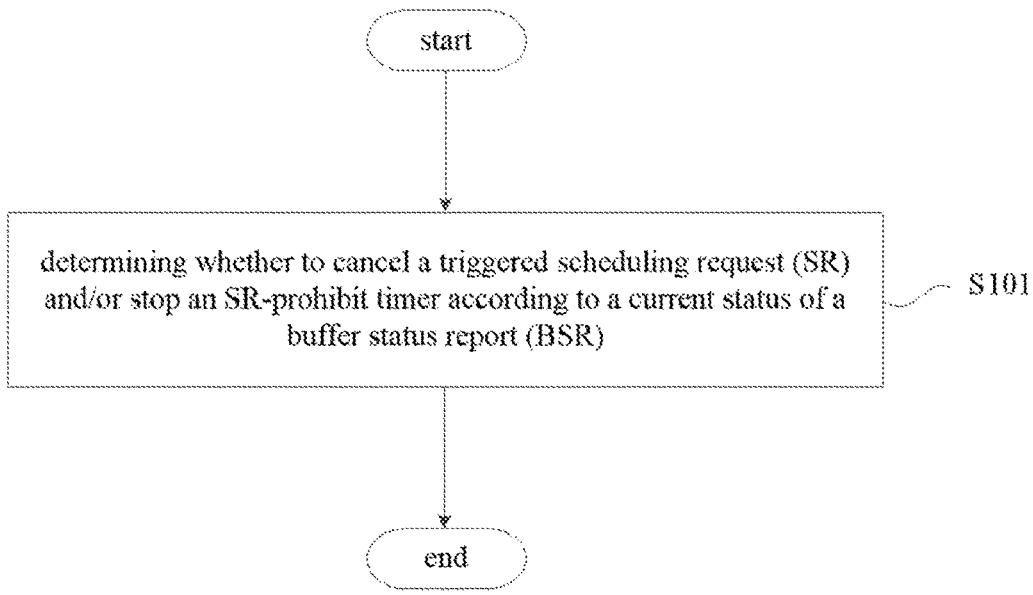
FIG. 1 is a flowchart of a scheduling request processing method according to an embodiment of the present application.

FIG. 1 is a flowchart of a scheduling request processing method according to an embodiment of the present application. The method shown in FIG. 1 is performed by a user equipment and includes:

Step S101: determining whether to cancel a triggered scheduling request (SR) and/or stop an SR-prohibit timer according to a current status of a buffer status report (BSR).

The current status of the BSR may include that the BSR has been assembled or the BSR has been transmitted. The BSR includes the buffer status when the BSR was last triggered. When it is determined that the triggered SR is canceled, the SR-prohibit timer is stopped.

With the technical solution provided in the embodiment of the present application, whether to cancel the triggered SR and/or stop the SR-prohibit timer can be determined according to the current status of the BSR. Thus, the technical solution improves cancellation/cancellation exemption mechanism of the SR, and especially when applied to the NR system, can reduce delay of the delay-sensitive service (such as URLLC service), thereby improving system performance.

Hereinafter, the method of the embodiment of the present application will be further described in conjunction with specific embodiments.

In one embodiment, if the current status of the BSR is that the BSR has been assembled or transmitted, the SR corresponding to the resource for assembling or transmitting the BSR is cancelled and/or the SR-prohibit timer stops.

The resource for assembling or transmitting the BSR may include:

(1) at least one of a numerology configuration resource, a bandwidth part (BWP) resource, and a component carrier (CC) resource corresponding to SR configuration; or (2) at least one of a numerology configuration resource, a bandwidth part (BWP) resource, and a component carrier (CC) resource corresponding to logical channel corresponding to SR configuration.

For example, a resource in which the SR is located is a numerology configuration resource corresponding to SR configuration, and this numerology configuration resource (assuming a subcarrier spacing is 15 kHz) has two SR configurations on a carrier 1, including SR configuration-1 (such as corresponding to subframes 1, 3, 5) and SR configuration-2 (such as corresponding to subframes 2, 4, 6). The numerology configuration resource corresponding to the SR configuration-1 is the numerology configuration resource of the carrier 1. The numerology configuration resource corresponding to the SR configuration-2 is the numerology configuration resource of the carrier 2. The SR configuration-1 corresponds to triggering of the eMBB service, and the SR configuration-2 corresponds to triggering of the URLLC service. Then, if the eMBB service is transmitted on the carrier 1, the SR corresponding to the SR configuration-1 on the carrier 1, i.e., the SR corresponding to the numerology configuration resource of the carrier 1, is cancelled. If the URLLC service is transmitted on the carrier 2, then, the SR corresponding to the SR configuration-2 on the carrier 1, i.e., the SR corresponding to the numerology configuration resource of the carrier 1, is cancelled, In this embodiment, when the BSR has been assembled or transmitted, the SR corresponding to the resource for assembling or transmitting the BSR is cancelled and/or the SR-prohibit timer stops. This can improve the cancellation mechanism of the SR and reduce the delay of the delay-sensitive service (such as the URLLC service), thereby improving the system performance.

In one embodiment, when determining whether to cancel the triggered SR and/or stop the SR-prohibit timer, if the current status of the BSR is that the BSR has been transmitted, all triggered SRs are canceled and/or the SR prohibit timer stops.

In this embodiment, when the BSR has been transmitted, all triggered SRs are canceled and/or the SR prohibit timer stops. Since there is no need to transmit the SR when the BSR has been transmitted, cancellation of all the triggered SRs can prevent unnecessary SRs from occupying resources, thereby further improving the cancellation mechanism of the SR.

In one embodiment, when determining whether to cancel the triggered SR and/or stop the SR-prohibit timer, whether to cancel the triggered SR and/or stop the SR-prohibit timer can be determined according to the current status of the BSR as well as a type of a logical channel used to carry the SR.

The type of the logical channel is used to indicate whether the logical channel is an SR cancellation exemption logical channel.

The type of logical channel may include an SR cancellation exemption logical channel and a non-SR cancellation exemption logical channel.

The SR cancellation exemption logical channel is pre-configured by the network device. When the network device pre-configures at least one logical channel as SR cancellation exemption logical channel, the at least one logical channel needs to meet at least one of the following conditions.

(1) A subcarrier spacing corresponding to the logical channel is greater than a preset threshold.

For example, the preset threshold is 15 kHz, the subcarrier spacing corresponding to the logical channel may be 15 kHz, 60 kHz, 240 kHz, or the like.

(2) Service corresponding to the logical channel is a specified low-latency service.

The specified low-latency service is, for example, URLLC service.

(3) The logical channel performs an independent scheduling request procedure.

In one embodiment, when determining whether to cancel the triggered SR and/or stop the SR-prohibit timer, for non-SR cancellation exemption logical channel, judging whether the current status of the BSR is that the BSR has been assembled; if yes, exempting cancellation of the SR on the SR cancellation exemption logical channel.

In this embodiment, when determining that the BSR has been assembled for non-SR cancellation exemption logical channel, cancellation of the SR on the SR cancellation exemption logical channel is exempted. Compared to the SR cancellation mechanism in the conventional LET system, this technical solution improves the cancellation exemption mechanism of the SR, and avoids the situation that cancellation of SR cannot be exempted according to the current situation (such as the current channel type or current status of the BSR).

In one embodiment, for non-SR cancellation exemption logical channel, after determining that the current status of the BSR is that the BSR has been assembled, it may further be determined whether the BSR transmitted on the non-SR cancellation exemption logical channel includes buffer size on the SR cancellation exemption logical channel. When determining that the BSR transmitted on the non-SR cancellation exemption logical channel does not include buffer size on the SR cancellation exemption logical channel, cancellation of the SR on the SR cancellation exemption logical channel is exempted.

In this embodiment, when determining that the BSR has been assembled for non-SR cancellation exemption logical channel and the BSR transmitted on the non-SR cancellation exemption logical channel does not include buffer size on the SR cancellation exemption logical channel, cancellation of the SR on the SR cancellation exemption logical channel is exempted. This further improves the cancellation mechanism of the SR.

Based on the foregoing embodiment, after exempting cancellation of the SR on the SR cancellation exemption logical channel, when scheduling request resource for the SR cancellation exemption logical channel is arrived, the SR on the SR cancellation exemption logical channel is transmitted.

In this embodiment, when the scheduling request resource for the SR cancellation exemption logical channel is arrived, the SR that is exempted from cancellation on the logical channel is transmitted, so that the SR on the SR cancellation exemption logical channel can continue to be transmitted after the SR is exempted from cancellation. This further improves the cancellation mechanism of the SR. Further, the arrival of the scheduling request resource enables the user equipment to need to transmit the SR, thus, the technical solution can continue to transmit the SR that is exempted from exemption when requiring transmitting SR, thereby reducing the delay and greatly improving the system performance.

In one embodiment, when determining whether to cancel the triggered SR and/or stop the SR-prohibit timer, for SR cancellation exemption logical channel, judging whether the current status of the BSR triggered by the SR cancellation exemption logical channel, is that the BSR has been assembled or transmitted; if yes, the SR on the SR cancellation exemption logical channel is cancelled and/or the SR-prohibit timer stops. That is, for SR cancellation exemption logical channel, only when the BSR triggered by the SR cancellation exemption logical channel itself has been assembled or transmitted, the SR on the SR cancellation exemption logical channel is cancelled and/or the SR-prohibit timer stops.

In this embodiment, only when the BSR triggered by the SR cancellation exemption logical channel itself has been assembled or transmitted, the SR on the SR cancellation exemption logical channel is cancelled and/or the SR-prohibit timer stops. This further improves the cancellation mechanism of the SR on the SR cancellation exemption logical channel.

In one embodiment, before the SR on the SR cancellation exemption logical channel is cancelled and/or the SR-prohibit timer stops, it may further be determined that all pending data on the SR cancellation exemption logical channel has been assembled or transmitted. That is, in addition to determining that the BSR triggered by the SR cancellation exemption logical channel itself has been assembled or transmitted, when determining that all pending data on the SR cancellation exemption logical channel has been assembled or transmitted, the SR on the SR cancellation exemption logical channel is cancelled and/or the SR-prohibit timer stops.

In this embodiment, when all pending data on the SR cancellation exemption logical channel has been assembled or transmitted, the SR on the SR cancellation exemption logical channel is cancelled and/or the SR-prohibit timer stops. Since there is no need to transmit SR when all pending data on the SR cancellation exemption logical channel has been assembled or transmitted, then cancellation of the SRs can prevent unnecessary SRs from occupying resources, thereby further improving the cancellation mechanism of the SR on the SR cancellation exemption logical channel.

The scheduling request processing method provided in the present application is described hereinafter through several specific embodiments.

Embodiment 1

Figure 2:
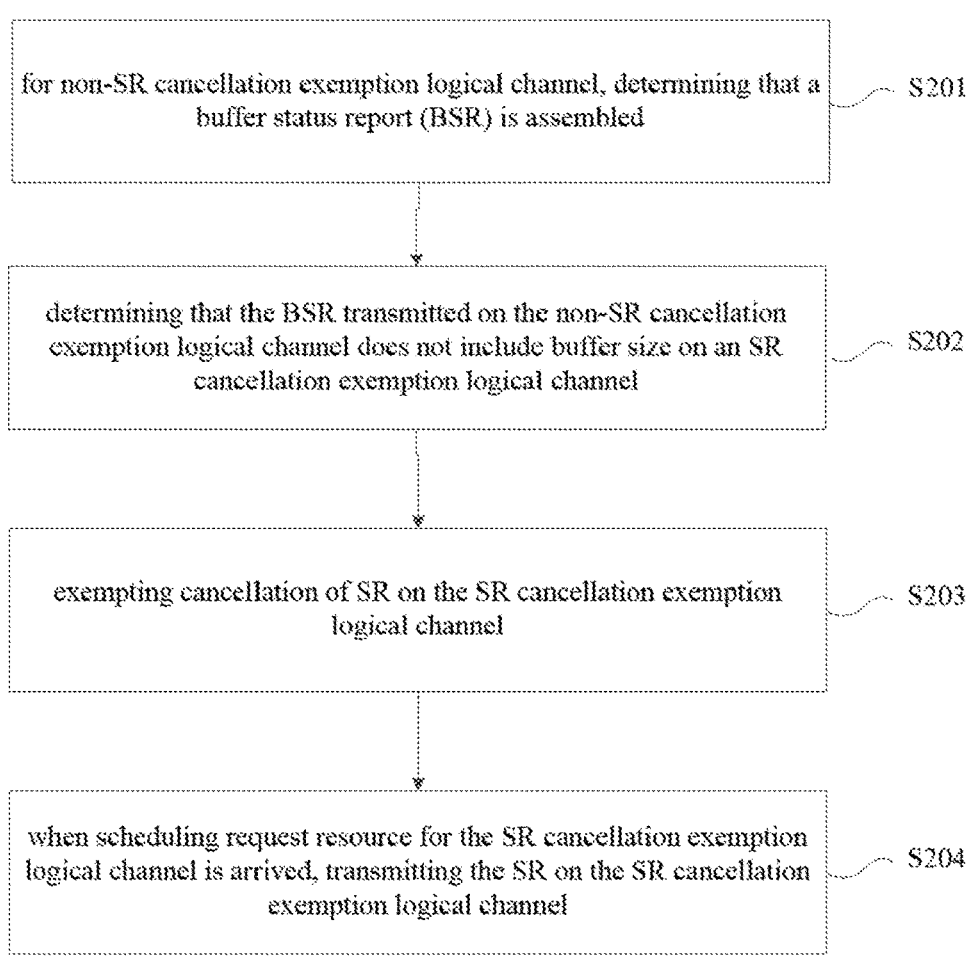
FIG. 2 is a flowchart of a scheduling request processing method according to a first specific embodiment of the present application.

FIG. 2 is a flowchart of a scheduling request processing method according to a first specific embodiment of the present application. The method shown in FIG. 2 is performed by a user equipment and may include the following steps:

Step S201: for non-SR cancellation exemption logical channel, determining that a buffer status report (BSR) is assembled.

Step S202: determining that the BSR transmitted on the non-SR cancellation exemption logical channel does not include buffer size on an SR cancellation exemption logical channel.

Step S203: exempting cancellation of SR on the SR cancellation exemption logical channel.

Step S204: when scheduling request resource for the SR cancellation exemption logical channel is arrived, transmitting the SR on the SR cancellation exemption logical channel.

In the first embodiment, the SR cancellation exemption logical channel is pre-configured by the network device. When the network device pre-configures at least one logical channel as SR cancellation exemption logical channel, the at least one logical channel needs to meet at least one of the following conditions.

(1) A subcarrier spacing corresponding to the logical channel is greater than a preset threshold.

For example, the preset threshold is 15 kHz, the subcarrier spacing corresponding to the logical channel may be 15 kHz, 60 kHz, 240 kHz, or the like.

(2) Service corresponding to the logical channel is a specified low-latency service.

The specified low-latency service is, for example, URLLC service.

(3) The logical channel performs an independent scheduling request procedure.

In the first embodiment, after the SR is transmitted on the non-SR cancellation exemption logical channel, when the BSR is assembled and the BSR transmitted on the non-SR cancellation exemption logical channel does not include buffer size on the SR cancellation exemption logical channel, cancellation of SR on the SR cancellation exemption logical channel is exempted. This further improves the cancellation mechanism of the SR. Further, when the scheduling request resource for the SR cancellation exemption logical channel is arrived, the SR that is exempted from cancellation on the logical channel is transmitted. Since the arrival of the scheduling request resource enables the user equipment to need to transmit the SR, the first embodiment can continue to transmit the SR that is exempted from exemption on the SR cancellation exemption logical channel, thereby reducing the delay and greatly improving the system performance.

Embodiment 2

Figure 3:
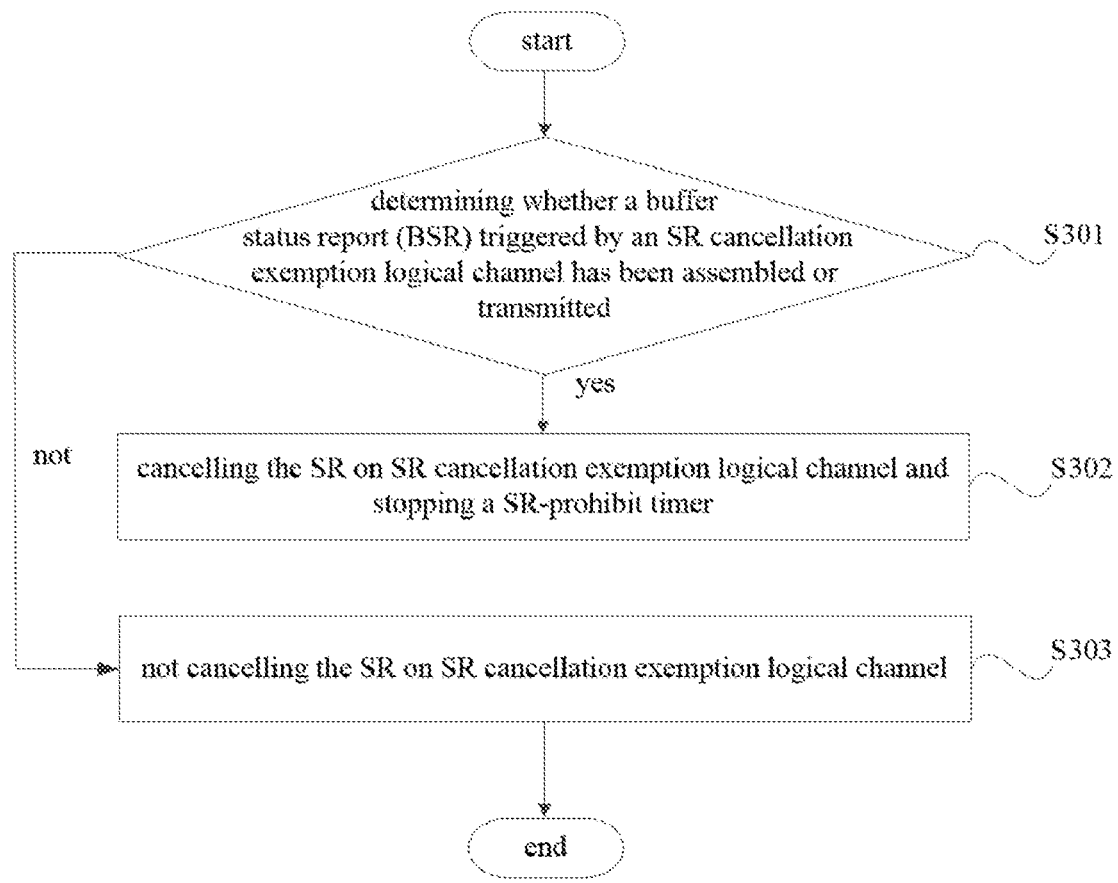
FIG. 3 is a flowchart of a scheduling request processing method according to a second specific embodiment of the present application.

FIG. 3 is a flowchart of a scheduling request processing method according to a second embodiment of the present application. The method shown in FIG. 3 is performed by a user equipment and may include the following steps.

Step S301: determining whether a buffer status report (BSR) triggered by an SR cancellation exemption logical channel has been assembled or transmitted. If yes, performing step S302; if not, performing step S303.

Step S302: cancelling the SR on SR cancellation exemption logical channel and stopping a SR-prohibit timer.

Step S303: not cancelling the SR on SR cancellation exemption logical channel.

In the second embodiment, the SR cancellation exemption logical channel is pre-configured by the network device. When the network device pre-configures at least one logical channel as SR cancellation exemption logical channel, the at least one logical channel needs to meet at least one of the following conditions.

(1) A subcarrier spacing corresponding to the logical channel is greater than a preset threshold.

For example, the preset threshold is 15 kHz, the subcarrier spacing corresponding to the logical channel may be 15 kHz, 60 kHz, 240 kHz, or the like.

(2) Service corresponding to the logical channel is a specified low-latency service.

The specified low-latency service is, for example, URLLC service.

(3) The logical channel performs an independent scheduling request procedure.

In the second embodiment, only when the BSR triggered by the SR cancellation exemption logical channel itself has been assembled or transmitted, the SR on the SR cancellation exemption logical channel is cancelled and/or the SR-prohibit timer stops. This further improves the cancellation mechanism of the SR on the SR cancellation exemption logical channel, and avoids the impact of current status of BSR on other logical channels on whether to cancel the SR on the SR cancellation exemption logical channel.

Embodiment 3

Figure 4:
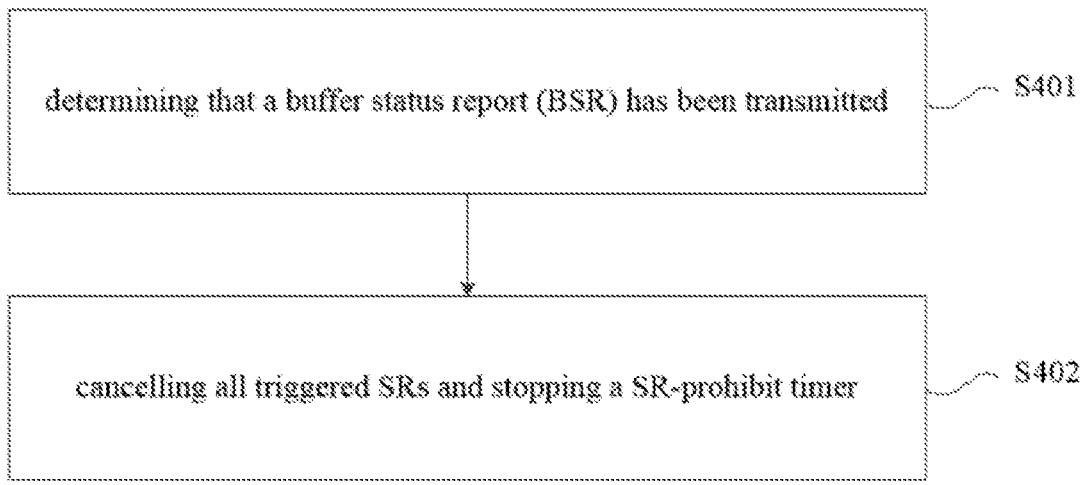
FIG. 4 is a flowchart of a scheduling request processing method according to a third specific embodiment of the present application.

FIG. 4 is a flowchart of a scheduling request processing method according to a third embodiment of the present application. The method shown in FIG. 4 is performed by a user equipment and may include the following steps:

Step S401: determining that a buffer status report (BSR) has been transmitted.

Step S402: cancelling all triggered SRs and stopping a SR-prohibit timer.

In the third embodiment, when the BSR has been transmitted, all the triggered SRs can be canceled and the SR-prohibit timer stops. Since there is no need to transmit the SR when the BSR has been transmitted, cancellation of all the triggered SRs at this point can prevent unnecessary SRs from occupying resources, thereby further improving the cancellation mechanism of the SR.

The specific embodiments of the specification have been described above. Other embodiments are within the scope of the appended claims. In some cases, actions or steps recorded in the claims may be performed in a sequence different from that in the embodiments and the desired results may still be achieved. In addition, the process described in the accompanying drawings does not necessarily require a particular order or a sequential order shown to achieve the desired result. In some embodiments, multitasking and parallel processing may be possible or advantageous.

Figure 5:
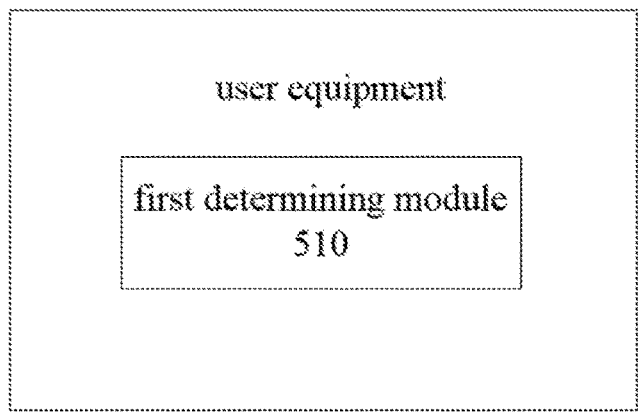
FIG. 5 is a schematic diagram of a user equipment according to an embodiment of the present application.

FIG. 5 is a schematic diagram of a user equipment according to an embodiment of the present application. Referring to FIG. 5, the user equipment may include:

a first determining module 510 used to determine whether to cancel a triggered scheduling request (SR) and/or stop an SR-prohibit timer according to a current status of a buffer status report (BSR).

In one embodiment, the BSR includes buffer status when the BSR was last triggered.

In one embodiment, the first determining module 510 includes:

a first determining unit used to, if the current status of the BSR is that the BSR has been assembled or transmitted, cancel the SR corresponding to the resource for assembling or transmitting the BSR and/or stop the SR-prohibit timer.

In one embodiment, the resource may include:

at least one of a numerology configuration resource, a bandwidth part (BWP) resource, and a component carrier (CC) resource corresponding to SR configuration; or at least one of a numerology configuration resource, a bandwidth part (BWP) resource, and a component carrier (CC) resource corresponding to logical channel corresponding to SR configuration.

In one embodiment, the first determining module 510 includes:

a first canceling unit used to, when the current status of the BSR is that the BSR has been transmitted, cancel all triggered SRs and/or stop the SR prohibit timer.

In one embodiment, the above user equipment further includes:

a second determining module used to, determine whether to cancel the triggered SR and/or stop the SR-prohibit timer according to a type of a logical channel used to carry the SR. The type of the logical channel is used to indicate whether the logical channel is an SR cancellation exemption logical channel.

In one embodiment, the first determining module 510 includes:

a first judging unit used to, for non-SR cancellation exemption logical channel except for the SR cancellation exemption logical channel, judge whether the current status of the BSR is that the BSR has been assembled;

an exemption cancellation unit used to, when the current status of the BSR is that the BSR has been assembled, exempt cancellation of the SR on the SR cancellation exemption logical channel.

In one embodiment, the first determining module 510 further includes:

a second determining unit used to, before exempting cancellation of the SR on the SR cancellation exemption logical channel, determine that the BSR transmitted on the non-SR cancellation exemption logical channel does not include buffer size on the SR cancellation exemption logical channel.

In one embodiment, the first determining module 510 further includes:

a transmission unit used to, after exempting cancellation of the SR on the SR cancellation exemption logical channel, when scheduling request resource for the SR cancellation exemption logical channel is arrived, transmit SR on the SR cancellation exemption logical channel.

In one embodiment, the first determining module 510 further includes:

a second judging unit used to, for SR cancellation exemption logical channel, judge whether the current status of the BSR triggered by the SR cancellation exemption logical channel, is that the BSR has been assembled or transmitted;

a second canceling unit used to, when the current status of the BSR triggered by the SR cancellation exemption logical channel is that the BSR has been assembled or transmitted, cancel the SR on the SR cancellation exemption logical channel and/or stop the SR-prohibit timer.

In one embodiment, the first determining module 510 further includes:

a third determining unit used to, before the SR on the SR cancellation exemption logical channel is cancelled and/or the SR-prohibit timer stops, determine that all pending data on the SR cancellation exemption logical channel has been assembled or transmitted.

In one embodiment, SR cancellation exemption logical channel meets at least one of the following conditions:

a subcarrier spacing corresponding to the logical channel is greater than a preset threshold;

service corresponding to the logical channel is a specified low-latency service;

logical channel performs an independent scheduling request procedure.

With the user equipment provided in the embodiment of the present application, whether to cancel the triggered SR and/or stop the SR-prohibit timer can be determined according to the current status of the BSR. Thus, the technical solution improves cancellation/cancellation exemption mechanism of the SR, and especially when applied to the NR system, can reduce delay of the delay-sensitive service (such as URLLC service), thereby improving system performance.

The user equipment provided in the embodiment of the present disclosure can implement various procedures implemented by the user equipment in the method embodiment of FIG. 1 to FIG. 4, and details are not repeatedly described herein.

Figure 6:
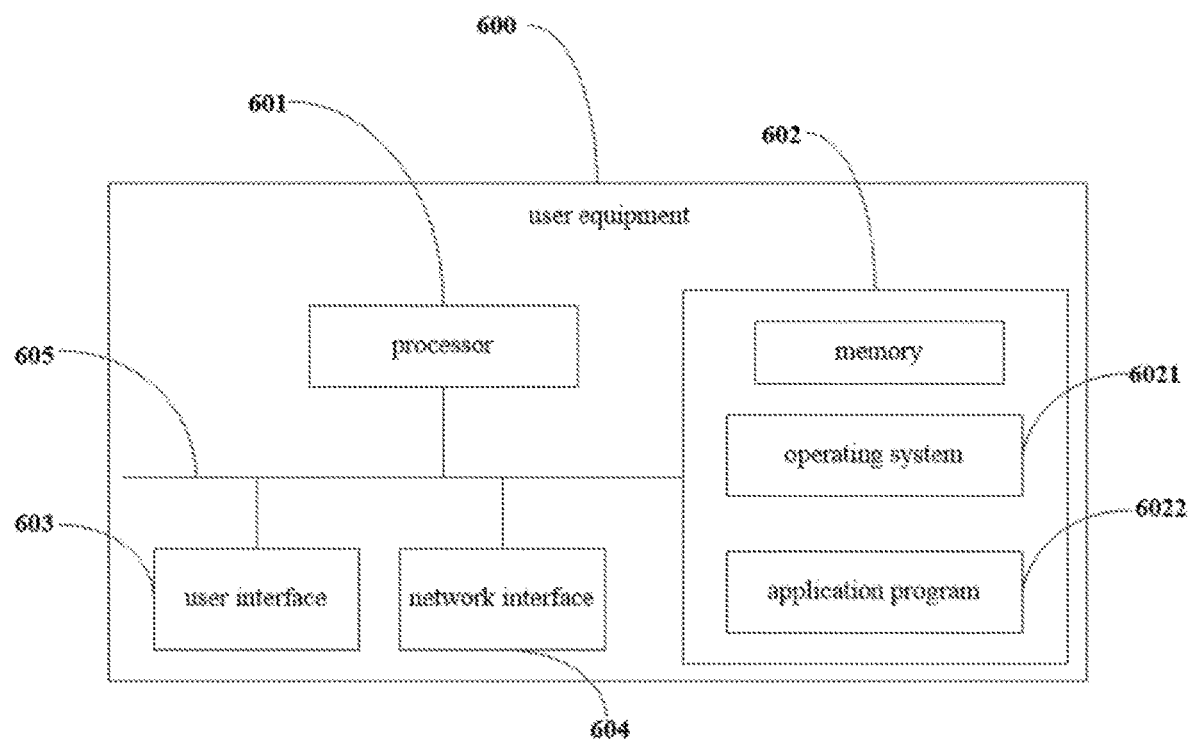
FIG. 6 is a schematic diagram of a user equipment according to an embodiment of the present application.

FIG. 6 is a block diagram of a user equipment according to another embodiment of the present disclosure. The user equipment 600 shown in FIG. 6 includes at least one processor 601, a memory 602, at least one network interface 604 and a user interface 603. The various components in the user equipment 600 are coupled together by a bus system 605. It will be appreciated that the bus system 605 is used to implement connection communication between these components. The bus system 605 includes a power bus, a control bus and a status signal bus in addition to the data bus. However, for clarity of description, various buses are labeled as bus system 605 in FIG. 6.

The user interface 603 may include a display device, a keyboard, or a clicking device (such as a mouse, a trackball, a touchpad, or a touch screen).

It can be understood that the memory 602 in embodiments of the present disclosure may be a volatile storage or a nonvolatile storage, or both the volatile storage and nonvolatile storage. The nonvolatile storage may be Read Only Memory (ROM), Programmable Read-Only Memory (PROM), Erasable Programmable Read-Only Memory (EPROM), Electrically Erasable Programmable Read-Only Memory (EEPROM) or flash. The volatile storage may be a Random Access Memory (RAM), which is used as an external cache. As an illustrative but not restrictive specification, many forms of RAMs are available, such as Static RAM (SRAM), Dynamic RAM (DRAM), Synchronous DRAM (SDRAM), Double Data Rate SDRAM (DDRSDRAM), Enhanced SDRAM (ESDRAM), Synchronization Link DRAM (SLDRAM) and Direct Rambus RAM (DRRAM). The memory 602 in the system and method described in embodiments of the present disclosure include, but is not limited to, these and any other suitable types of storages.

In some embodiments, the memory 602 stores following elements, such as executable modules, data structure, subset thereof, or superset thereof: operating system 6021 and an application program 6022.

The operating system 6021 includes various kinds of system programs, such as a framework layer, a core library layer and a driver layer, which are used to implement various kinds of basic services and process hardware-based tasks. The application program 6022 includes various kinds of application programs, such as Media Player and Browser, which are used to implement various kinds of application services. Programs, which are used to implement the methods in embodiments of the present disclosure, may be included in the application program 6022.

In one embodiment of the present disclosure, the user equipment 600 further includes: a computer program which is stored on the memory 602 and executable on the processor 601. Specifically, the computer program may be executed by the processor 601 to implement the following steps: determining whether to cancel a triggered scheduling request (SR) and/or stop an SR-prohibit timer according to a current status of a buffer status report (BSR).

The methods in the above embodiments of the present disclosure may be applied to or implemented by the processor 601. The processor 601 may be an integrated circuit chip with signal processing capability. In the implementation process, each step of the above method can be completed by the integrated logic circuit of the hardware in processor 601 or the instructions in the form of software. The processor 601 mentioned above may be a general purpose processor, Digital Signal Processor (DSP), Application Specific Integrated Circuit (ASIC), Field Programmable Gate Array (FPGA) or other Programmable logic device, discrete Gate or transistor logic device, discrete hardware component. Methods, steps and logical block diagrams disclosed in embodiments of the present disclosure may be realized or implemented. A general-purpose processor can be a microprocessor or the general-purpose processor can be any regular processor, etc. The steps in combination with the method disclosed in embodiments of the present disclosure may be directly embodied as the execution of the hardware decoding processor or by a combination of hardware and software modules in the decoding processor. Software modules can be located in random access memory, flash memory, read only memory, programmable read only memory or electrically-erasable programmable memory, register and other mature computer readable storage media in this field. The storage medium is located in the memory 602, and the processor 601 reads the information in the memory 602 to implement steps in the above method in combination with the hardware. Specifically, a computer program is stored on the computer-readable storage medium. When the computer program is executed by the processor 601, the steps of the scheduling request processing method of the foregoing embodiment are implemented.

It can be understood that these embodiments described in the present disclosure may be implemented with hardware, software, firmware, middleware, microcode, or a combination thereof. As for hardware implementation, the processing unit can be implemented in one or multiple Application-Specific Integrated Circuits (ASIC), Digital Signal Processors (DSP), Digital Signal Processing Devices (DSPD), Programmable Logic Devices (PLD), Field-Programmable Gate Arrays (FPGA), general-purpose processors, controllers, micro-controllers, micro-processors, and other electronic units or combinations thereof used to perform the functions described in the present disclosure.

For software implementations, the technologies described in the present disclosure can be implemented through the modules that perform the functions described in the present disclosure (such as procedures, functions, and so on). Software codes can be stored in the storage and executed by the processor. The storage can be implemented in or outside of the processor.

Optionally, the BSR includes buffer status when the BSR was last triggered.

Optionally, the computer program is executed by the processor 601 to implement the following steps:

if the current status of the BSR is that the BSR has been assembled or transmitted, cancelling the SR corresponding to the resource for assembling or transmitting the BSR and/or stopping the SR-prohibit timer.

Optionally, the resource may include:

at least one of a numerology configuration resource, a bandwidth part (BWP) resource, and a component carrier (CC) resource corresponding to SR configuration; or at least one of a numerology configuration resource, a bandwidth part (BWP) resource, and a component carrier (CC) resource corresponding to logical channel corresponding to SR configuration.

Optionally, the computer program is executed by the processor 601 to implement the following steps: when the current status of the BSR is that the BSR has been transmitted, cancelling all triggered SRs and/or stopping the SR prohibit timer.

Optionally, the computer program is executed by the processor 601 to implement the following steps: determining whether to cancel the triggered SR and/or stop the SR-prohibit timer according to a type of a logical channel used to carry the SR. The type of the logical channel is used to indicate whether the logical channel is an SR cancellation exemption logical channel.

Optionally, the computer program is executed by the processor 601 to implement the following steps: for non-SR cancellation exemption logical channel except for the SR cancellation exemption logical channel, judging whether the current status of the BSR is that the BSR has been assembled; if yes, exempting cancellation of the SR on the SR cancellation exemption logical channel.

Optionally, the computer program is executed by the processor 601 to implement the following steps: before exempting cancellation of the SR on the SR cancellation exemption logical channel, determining that the BSR transmitted on the non-SR cancellation exemption logical channel does not include buffer size on the SR cancellation exemption logical channel.

Optionally, the computer program is executed by the processor 601 to implement the following steps: after exempting cancellation of the SR on the SR cancellation exemption logical channel, when scheduling request resource for the SR cancellation exemption logical channel is arrived, transmitting SR on the SR cancellation exemption logical channel.

Optionally, the computer program is executed by the processor 601 to implement the following steps: for SR cancellation exemption logical channel, judging whether the current status of the BSR triggered by the SR cancellation exemption logical channel, is that the BSR has been assembled or transmitted; if yes, cancelling the SR on the SR cancellation exemption logical channel and/or stopping the SR-prohibit timer.

Optionally, the computer program is executed by the processor 601 to implement the following steps: before the SR on the SR cancellation exemption logical channel is cancelled and/or the SR-prohibit timer stops, determining that all pending data on the SR cancellation exemption logical channel has been assembled or transmitted.

In one embodiment, SR cancellation exemption logical channel meets at least one of the following conditions:

a subcarrier spacing corresponding to the logical channel is greater than a preset threshold;

service corresponding to the logical channel is a specified low-latency service;

logical channel performs an independent scheduling request procedure.

The user equipment 600 can implement various procedures implemented by the user equipment in the foregoing embodiment. To avoid repetition, details are not described herein again.

With the user equipment provided in the embodiment of the present application, whether to cancel the triggered SR and/or stop the SR-prohibit timer can be determined according to the current status of the BSR. Thus, the technical solution improves cancellation/cancellation exemption mechanism of the SR, and especially when applied to the NR system, can reduce delay of the delay-sensitive service (such as URLLC service), thereby improving system performance.

Those skilled in the art will appreciate that embodiments of the present disclosure may be provided as a method, system, or computer program product. Accordingly, the present disclosure may take the form of an entirely hardware embodiment, an entirely software embodiment, or a combination of software and hardware. Moreover, the present disclosure can take the form of a computer program product embodied on one or more computer-usable storage media (including but not limited to disk storage, CD-ROM, optical storage, etc.) including computer usable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

In a typical configuration, a computing device includes one or more processors (CPUs), input/output interfaces, network interfaces, and a memory.

The memory may include a non-persistent memory, a random access memory (RAM) and/or non-volatile memory in a computer readable medium, such as read only memory (ROM) or flash memory. The memory is an example of a computer readable medium.

The computer readable media may be permanent and non-persistent, removable and non-removable media, which can store information by any method or technology. The information may be computer-readable instructions, data structures, modules of a program, or other data. Examples of the computer storage media include, but are not limited to, phase change memory (PRAM), static random access memory (SRAM), dynamic random access memory (DRAM), other types of random access memory (RAM), and read-only memory (ROM), electrically erasable programmable read-only memory (EEPROM), flash memory or other memory technology, read-only disc read-only memory (CD-ROM), digital versatile disc (DVD) or other optical storage, magnetic tape cartridges, magnetic tape magnetic disk storage or other magnetic storage devices or any other non-transmission media which may be used to store information that can be accessed by computing devices. As defined herein, the computer-readable media does not include computer-readable transitory media such as modulated data signals and carrier waves.

It is also to be understood that terms "comprise", "include" or any other variations are intended to encompass a non-exclusive inclusion, such that a process, method, system, commodity, or device that include a series of steps or elements include not only those steps or elements but also other steps or elements that are not explicitly listed, or steps or elements that are inherent to such process, method, commodity, or device. An element defined by the phrase "comprising a . . . " does not exclude the presence of additional equivalent elements in the process, method, commodity, or device including the element.

Those skilled in the art will appreciate that embodiments of the present disclosure may be provided as a method, system, or computer program product. Accordingly, the present disclosure may take the form of an entirely hardware embodiment, an entirely software embodiment, or a combination of software and hardware. Moreover, the present disclosure can take the form of a computer program product embodied on one or more computer-usable storage media (including but not limited to disk storage, CD-ROM, optical storage, etc.) including computer usable program codes.

The above are only the specific embodiments of the present disclosure, but the protection scope of the present disclosure is not limited to these embodiments. Any technical personnel who is familiar with the technical field can easily think of changes or substitutions within the technical scope of the present disclosure and these changes and substitutions should be included in the protection scope of the present disclosure.

What is claimed is:

1. A scheduling request processing method, performed by a user equipment, comprising:
   determining whether to cancel a triggered scheduling request (SR) and/or stop an SR-prohibit timer according to a current status of a buffer status report (BSR) and a type of a logical channel used to carry the SR;
   wherein the BSR comprises buffer status when the BSR was last triggered; and the type of the logical channel is used to indicate whether the logical channel is an SR cancellation exemption logical channel.

2. The method according to claim 1, wherein the determining whether to cancel a triggered scheduling request (SR) and/or stop an SR-prohibit timer, comprises:
   for non-SR cancellation exemption logical channel except for the SR cancellation exemption logical channel, judging whether the current status of the BSR is that the BSR has been assembled;
   if yes, exempting cancellation of SR on the SR cancellation exemption logical channel.

3. The method according to claim 2, wherein before exempting cancellation of SR on the SR cancellation exemption logical channel, the method further comprises:
   determining that the BSR transmitted on the non-SR cancellation exemption logical channel does not include buffer size on an SR cancellation exemption logical channel.

4. The method according to claim 2, wherein after exempting cancellation of SR on the SR cancellation exemption logical channel, the method further comprises:
   when scheduling request resource for the SR cancellation exemption logical channel is arrived, transmitting the SR on the SR cancellation exemption logical channel.

5. The method according to claim 1, wherein the determining whether to cancel a triggered scheduling request (SR) and/or stop an SR-prohibit timer, comprises: for the SR cancellation exemption logical channel, judging whether the current status of the BSR triggered by the SR cancellation exemption logical channel, is that the BSR has been assembled or transmitted; if yes, cancelling the SR on the SR cancellation exemption logical channel and/or stopping the SR-prohibit timer.

6. The method according to claim 5, wherein before cancelling the SR on the SR cancellation exemption logical channel and/or stopping the SR-prohibit timer, the method further comprises:
   determining that all pending data on the SR cancellation exemption logical channel has been assembled or transmitted.

7. The method according to claim 1, wherein the SR cancellation exemption logical channel meets at least one of the following conditions: a subcarrier spacing corresponding to the logical channel is greater than a preset threshold; service corresponding to the logical channel is a specified low-latency service; logical channel performs an independent scheduling request procedure.

8. A user equipment comprising: a processor, a memory, and a computer program stored on the memory and operable on the processor; wherein the computer program is executed by the processor to implement steps of a scheduling request processing method comprising:
   determining whether to cancel a triggered scheduling request (SR) and/or stop an SR-prohibit timer according to a current status of a buffer status report (BSR) and a type of a logical channel used to carry the SR;
   wherein the BSR comprises buffer status when the BSR was last triggered; and the type of the logical channel is used to indicate whether the logical channel is an SR cancellation exemption logical channel.

9. The user equipment according to claim 8, wherein the computer program is executed by the processor to implement:

for non-SR cancellation exemption logical channel except for the SR cancellation exemption logical channel, judging whether the current status of the BSR is that the BSR has been assembled;

if yes, exempting cancellation of SR on the SR cancellation exemption logical channel.

10. The user equipment according to claim 9, wherein before exempting cancellation of SR on the SR cancellation exemption logical channel, the computer program is executed by the processor to implement:

determining that the BSR transmitted on the non-SR cancellation exemption logical channel does not include buffer size on an SR cancellation exemption logical channel.

11. The user equipment according to claim 9, wherein after exempting cancellation of SR on the SR cancellation exemption logical channel, the computer program is executed by the processor to implement:

when scheduling request resource for the SR cancellation exemption logical channel is arrived, transmitting the SR on the SR cancellation exemption logical channel.

12. The user equipment according to claim 8, wherein the computer program is executed by the processor to implement:

for the SR cancellation exemption logical channel, judging whether the current status of the BSR triggered by the SR cancellation exemption logical channel, is that the BSR has been assembled or transmitted;

if yes, cancelling the SR on the SR cancellation exemption logical channel and/or stopping the SR-prohibit timer.

13. The user equipment according to claim 12, wherein before cancelling the SR on the SR cancellation exemption logical channel and/or stopping the SR-prohibit timer, the computer program is executed by the processor to implement:

determining that all pending data on the SR cancellation exemption logical channel has been assembled or transmitted.

14. The user equipment according to claim 8, wherein the SR cancellation exemption logical channel meets at least one of the following conditions:

a subcarrier spacing corresponding to the logical channel is greater than a preset threshold;

service corresponding to the logical channel is a specified low-latency service;

logical channel performs an independent scheduling request procedure.

15. A non-transitory computer readable storage medium comprising a computer program stored thereon; wherein the computer program is executed by a processor to implement steps of:

determining whether to cancel a triggered scheduling request (SR) and/or stop an SR-prohibit timer according to a current status of a buffer status report (BSR) and a type of a logical channel used to carry the SR;

wherein the BSR comprises buffer status when the BSR was last triggered; and the type of the logical channel is used to indicate whether the logical channel is an SR cancellation exemption logical channel.

16. The non-transitory computer readable storage medium according to claim 15, wherein the computer program is executed by the processor to implement:

for non-SR cancellation exemption logical channel except for the SR cancellation exemption logical channel, judging whether the current status of the BSR is that the BSR has been assembled;

if yes, exempting cancellation of SR on the SR cancellation exemption logical channel.

17. The non-transitory computer readable storage medium according to claim 16, wherein before exempting cancellation of SR on the SR cancellation exemption logical channel, the computer program is executed by the processor to implement:

determining that the BSR transmitted on the non-SR cancellation exemption logical channel does not include buffer size on an SR cancellation exemption logical channel.

18. The non-transitory computer readable storage medium according to claim 16, wherein after exempting cancellation of SR on the SR cancellation exemption logical channel, the computer program is executed by the processor to implement:

when scheduling request resource for the SR cancellation exemption logical channel is arrived, transmitting the SR on the SR cancellation exemption logical channel.

19. The non-transitory computer readable storage medium according to claim 15, wherein the computer program is executed by the processor to implement:

for the SR cancellation exemption logical channel, judging whether the current status of the BSR triggered by the SR cancellation exemption logical channel, is that the BSR has been assembled or transmitted;

if yes, cancelling the SR on the SR cancellation exemption logical channel and/or stopping the SR-prohibit timer.

20. The non-transitory computer readable storage medium according to claim 19, wherein before cancelling the SR on the SR cancellation exemption logical channel and/or stopping the SR-prohibit timer, the computer program is executed by the processor to implement:

determining that all pending data on the SR cancellation exemption logical channel has been assembled or transmitted.

* * * * *